United States Patent [19]

Taylor

[11] Patent Number: 5,373,698

[45] Date of Patent: Dec. 20, 1994

[54] INERT GAS TURBINE ENGINE

[76] Inventor: Alan Taylor, 41033 U.S. Rte. 11, Antwerp, N.Y. 13608

[21] Appl. No.: 907,723

[22] Filed: Jul. 2, 1992

[51] Int. Cl.$^5$ ............................................. F01K 11/00
[52] U.S. Cl. ........................................ 60/669; 60/269; 60/671; 60/726
[58] Field of Search ................. 60/669, 650, 682, 651, 60/671, 39.182, 269, 726

[56] References Cited

U.S. PATENT DOCUMENTS

| | | | |
|---|---|---|---|
| 2,597,249 | 5/1952 | Kollsman | 60/59 |
| 3,312,065 | 4/1967 | Guin | 60/670 X |
| 3,538,709 | 11/1970 | Pensel | 60/670 |
| 3,850,147 | 11/1974 | Doerner | 122/11 |
| 3,863,454 | 2/1975 | Doerner | 60/669 |
| 4,009,576 | 3/1977 | Doerner et al. | 60/669 |
| 4,069,673 | 1/1978 | Lapeyre | 60/641 |
| 4,070,862 | 1/1978 | Doerner et al. | 60/655 |
| 4,165,614 | 8/1979 | Yeh | 60/669 X |
| 4,760,705 | 8/1988 | Yogev et al. | 60/651 |

Primary Examiner—Stephen F. Husar
Attorney, Agent, or Firm—Heslin & Rothenberg

[57] ABSTRACT

An inert gas turbine engine contains a working fluid closed loop system leading from an expansion turbine which is in fluid flow relationship with an expansion chamber. Working fluid within the expansion chamber is heated by the combustion of compressed air and fuel within the combustion chamber. The heated working fluid within the expansion chamber rotates an expansion turbine which in turn rotates the compressor. Combusted gases do not contact the turbine blades. The rotation of the expansion turbine is controlled by the temperature and pressure of the working fluid within the expansion chamber. The temperature of the expansion turbine and working fluid within the expansion chamber may be controlled by the use of various cooling means. Additional turbines may be incorporated within the engine to be turned by the working fluid within the expansion chamber. Heated working fluid which rotates the turbines may be cooled and compressed within the closed loop system prior to re-entry into the expansion chamber and reheating therein.

20 Claims, 6 Drawing Sheets

INERT GAS TURBINE ENGINE

BACKGROUND OF THE INVENTION

This invention relates to the field of turbine engines and more particularly to an inert gas turbine engine.

Turbine engines typically utilize exhaust gases from a combustion chamber to power one or more turbines which are exposed to the exhaust gases of the engine. A turbine is typically connected by a shaft and/or gear system to a compressor located at the inlet portion of the engine which compresses inlet air prior to combustion within the combustion chamber. The inlet air is mixed with fuel within the combustion chamber where combustion occurs thereby enabling combustion gases to rotate the turbines and power the compressor. Thrust is generated by the combination of compressed air and fuel mixture within the combustion chamber thereby enabling the engine to power certain vehicles, particularly aircraft.

This conventional type of design suffers from various deficiencies which impede engine performance and efficiency. For example, the turbines are in direct contact with the combustion gases and, therefore, are subject to extremely high temperatures. Since the turbine blades are designed to operate below a certain maximum temperature, the temperature of the turbine blades must be regulated and maintained below this critical temperature. Certain techniques are used to prevent the turbine blades from reaching the desired temperature. For example, reducing the concentration of combustible gases by increasing cool air flow through the combustion chamber, and/or by reducing the amount of fuel injected into the combustion chamber, one may prevent high turbine blade temperatures. The problem with this technique is that engine performance is severely compensated since a reduction of either the amount of compressed air or fuel significantly reduces engine thrust.

Another technique for reducing turbine blade temperatures is to cool the turbine blades by means of a fluid such as fuel or air. This may be accomplished by allowing the fuel to contact the turbine blades. Normally, holes are drilled directly through the turbine blades to allow fuel or air, to flow out of the turbine blades and into the exhaust section of the turbine engine. Although this technique may adequately reduce turbine blade temperatures without significantly compensating for engine thrusts, fuel which normally would have been used in the combustion chamber, is not properly combusted. The result being that this technique for cooling turbine blade temperatures significantly reduces engine efficiency by increasing fuel consumption.

It is therefore an object of the present invention to provide a gas turbine engine which facilitates improved engine efficiency and performance.

SUMMARY OF THE INVENTION

Improved turbine engine performance and efficiency may be obtained through implementation of the axial flow turbine engine in accordance with the principles of the present invention.

An inert gas turbine engine in accordance with the principles of the present invention includes an inlet section having a compressor therein; a combustion section in air flow relationship with the inlet section and compressor, comprising a combustion chamber in air flow relationship with the compressor; an expansion chamber in heat transfer relationship with the combustion chamber; an exhaust section in air flow relationship with the combustion section; an expansion turbine in fluid flow relationship with the expansion chamber wherein heated working fluid from the expansion chamber rotates the expansion turbine; and a working fluid closed loop system having a condenser portion in fluid flow relationship with the expansion chamber and expansion turbine. Working fluid within the expansion chamber may be heated within the expansion chamber to rotate the expansion turbine before being cooled in the condenser portion of the working fluid closed loop system and then reheated in the expansion chamber.

The inert gas turbine engine also includes a means for driving the compressor as the expansion turbine rotates to force air from the compressor into the combustion chamber where it is mixed with fuel and combusted. The combusted fuel and air within the combustion chamber heats the working fluid in the expansion chamber causing the working fluid to rotate the expansion turbine and drive the compressor. The driven compressor forces air into the combustion chamber to be mixed with fuel and combusted.

The combustion chamber may be annular in shape and surround at least a portion of the expansion chamber a means for driving the compressor may include a shaft connected to the compressor and expansion turbine so that rotation of the expansion turbine will rotate the compressor blades. The closed loop system may include a heat exchanger therein for cooling the working fluid within the closed loop system which has been heated within the expansion chamber. The closed loop system may also include a compressor for compressing the working fluid which has been heated into a gas phase within the expansion chamber. The closed loop system may also include a first storage tank.

The inert gas turbine engine may also include an impulse reaction turbine in fluid flow relationship with the expansion chamber so that heated working fluid within the expansion chamber will turn the impulse reaction turbine. Typically, the impulse reaction turbine wheels are located in a position such that heated working fluid will rotate the impulse reaction turbine wheels prior to contact with the expansion turbine blades and rotation of the expansion turbine. The engine may also include a variable turbine nozzle assembly located in a position to allow heated gas within the expansion chamber to pass through the variable turbine nozzle assembly prior to contact with the impulse reaction turbine blades and expansion turbine blades. The engine may also include an expansion chamber thermocontrol housing defining a cooling chamber therein which is in heat transfer relationship with the expansion chamber. Compressed air from the compressor may pass through the cooling chamber for cooling the temperature within the expansion chamber. Fins may be located within the cooling chamber and expansion chamber to optimize the cooling within the expansion chamber.

The engine may also include a second closed loop working fluid system in parallel fluid flow relationship with the first closed loop working fluid system. The second closed loop working fluid system may also be in fluid flow relationship with the expansion chamber and expansion turbine for cooling the working fluid from the expansion chamber and expansion turbine prior to reheating in the expansion chamber. Both the first closed loop system and second closed loop system allow fluid to flow from the expansion chamber to the expansion turbine. The first or second closed loop system may be connected to a fire extinguishing system such that the working fluid within the closed loop system may be released therefrom and used to extinguish a fire within the engine or engine housing.

The first and second closed loop system may include means for controlling the flow of working fluid therethrough. The means for controlling the flow of working fluid through the first or second closed loop system may include one or more valves within the closed loop system. The valves may be controlled by a microprocessor to provide a correct amount of working fluid to flow through the closed loop system. The engine may also include a means for allowing working fluid within the closed loop system to cool the expansion turbine and/or impulse reaction turbines. The means for allowing working fluid within the closed loop system to cool the turbines may include a conduit leading from the closed loop system where the conduit is in fluid flow relationship with the expansion turbine and closed loop system to cool the expansion turbine. The engine may also include a variable area reducer located within the expansion chamber for varying the volume within the expansion chamber.

BRIEF DESCRIPTION OF THE DRAWINGS

The description of the invention will be made in reference to the drawings where like numerals represent like features throughout the drawings and in which.

DETAILED DESCRIPTION

Figure 1:
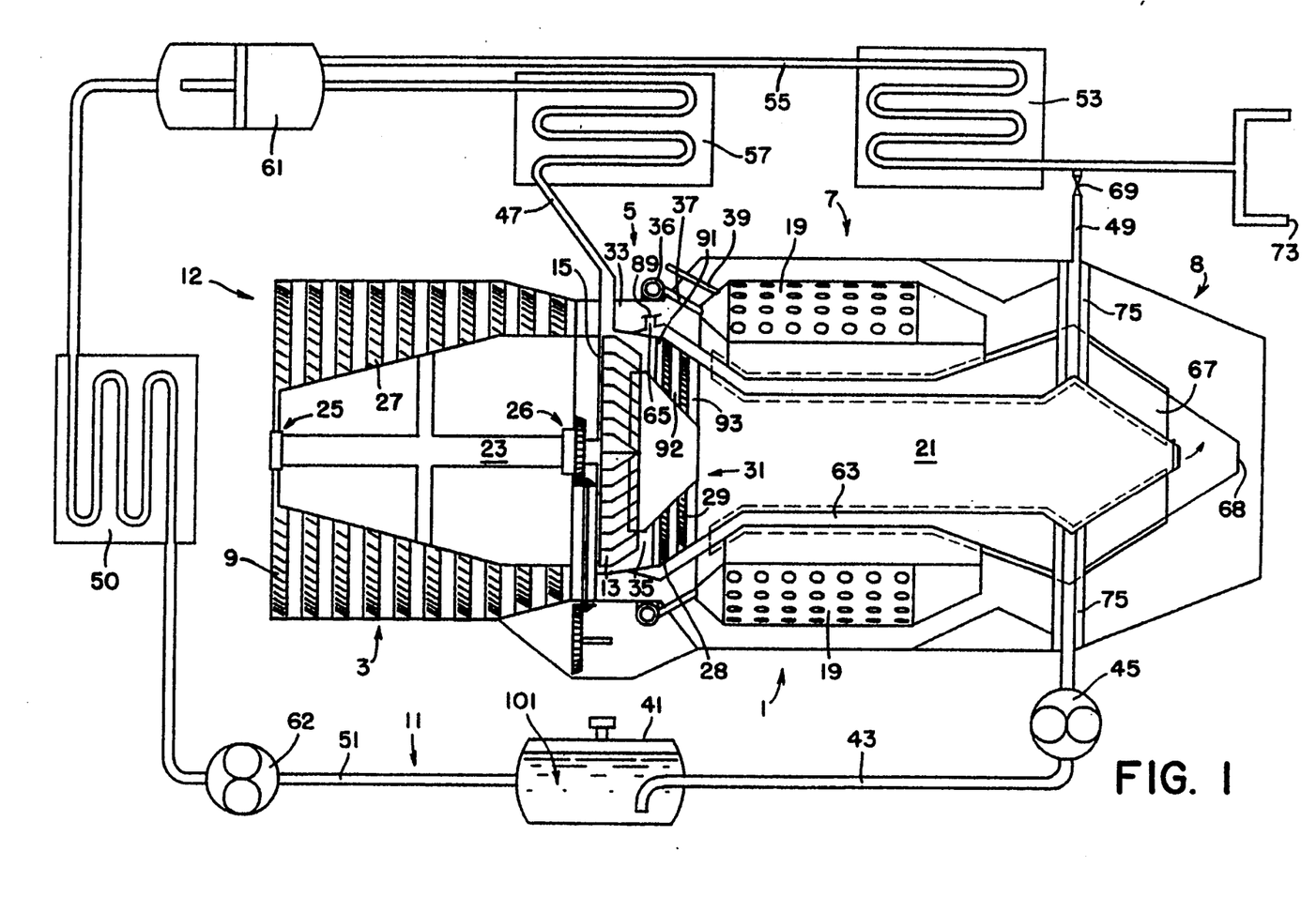
FIG. 1 depicts a schematic representation of an axial flow inert gas turbine engine in accordance with the principles of the present invention.
Figure 3:
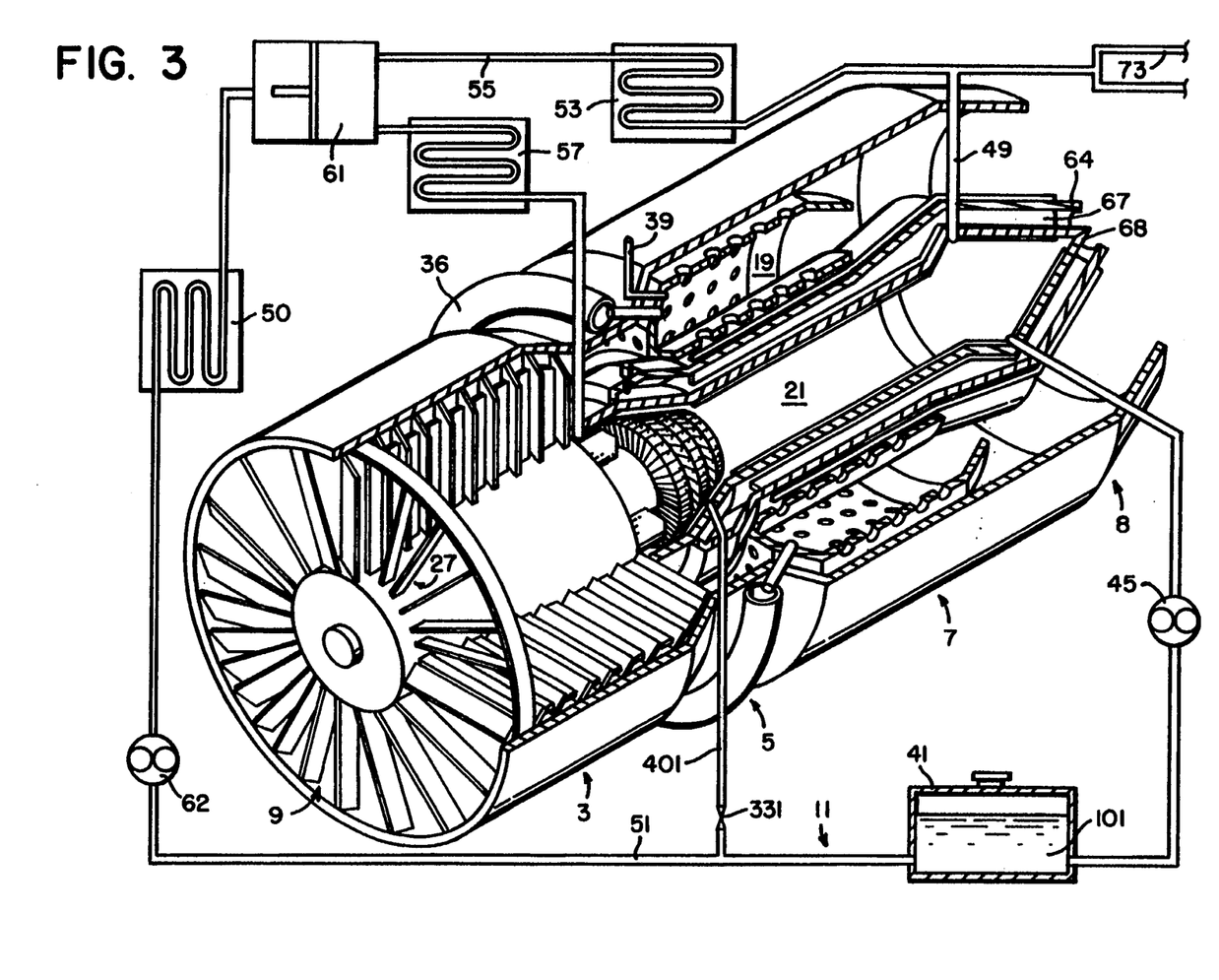
FIG. 3 is an isometric sectional view of an axial flow inert gas turbine engine in accordance with the principles of the present invention.

Referring to FIGS. 1 and 3, the axial flow turbine engine generally denoted 1 includes a compressor section 3, a turbine section 5, a combustion section 7 and an exhaust section 8. A closed loop system 11 containing a working fluid therein is integrated into the engine.

The compressor section 3 includes a compressor 9 such as those used in conventional turbine engines which are well known in the art and a shaft 23. Description of the engine will be made with reference herein to the axial, radial, forward and rearward direction. These directions are relative to the shaft 23 where the compressor 9 is at the forward section of the engine and the exhaust section 8 is at the rearward section. An air inlet 12 is located at the forward section of the compressor section 3 to allow air flow rearwardly within the compressor 9. The turbine section 5 contains an expansion turbine 13 in a diffuser housing 15 and turbine nozzles 91, 92, 93. The combustion section 7 of the engine includes a combustion chamber 19 and, an expansion chamber 21 in heat transfer relationship with the combustion chamber 19. The exhaust section 8 trails the combustion section and allows combusted gases to exit the engine.

The expansion turbine 13 is connected to the shaft 23 which drives the compressor 9 and engine accessories not shown as the expansion turbine 13 rotates. The shaft, which is supported by bearings 25, 26 within the compressor section 3, rotates the compressor blades 27 to compress air within the inlet 12 of the compressor 9.

The turbine section 5, which contains the expansion turbine 13, diffuser housing 15, and turbine nozzles 91, 92, 93, also includes impulse reaction turbines 28, 29, and 31 having multiple sets of turbine blades. Although not shown in FIGS. 1 or 3, additional turbines may also be included within the turbine section without departing from the invention. In FIG. 1, the turbine section 5, mounted between the compressor section 3 and combustion section 7, contains a lead diffuser housing 33 which is connected to the compressor 9 such that air from the compressor flows into the lead diffuser housing 33. An inner cavity 35 is isolated from the lead diffuser housing 33 and surrounds the expansion turbine 13, the diffuser housing 15, the impulse reaction turbines 28, 29, and 31 and the turbine nozzles 91, 92, 93.

The combustion section 7 contains an outer annular shaped combustion chamber 19 which is connected, in the axially forward direction to the lead diffuser housing 33 of the turbine section. An expansion chamber 21 within the combustion chamber is in fluid flow relationship with the inner cavity 35 of the turbine section. The lead diffuser housing 33 places the combustion chamber 19 in fluid flow relationship with the compressor 9 such that compressed air from the compressor 9 flows rearwardly through the lead diffuser housing 33 of the turbine section 5 and into the combustion chamber 19 of the combustion section 7. The combustion chamber 19 includes a fuel manifold 36, connected to a fuel nozzle 37 therein and an ignitor 39 which initiates combustion within the combustion chamber 19. The fuel nozzle 37 is located at the entry of the combustion chamber 19 such that fuel can be mixed with compressed air as the air enters the combustion chamber 19 and flows rearwardly. The ignitor 39 then ignites the fuel and air mixture within the combustion chamber. The combusted gases then exit the combustion chamber via the exhaust section 8.

Referring still to FIGS. 1 and 3, a closed loop thermodynamic system 11 which contains a working fluid 101 therein is integral with the gas turbine engine. The expansion chamber 21 of the combustion section 7 is in fluid flow relationship with a tank 41 containing the working fluid 101 therein. The working fluid is fed into the expansion chamber 21 by means of a conduit 43 and a pump 45. Although a gear type pump, as shown, may be preferred, other types of pumps may be used. The closed loop system also includes additional conduits 47, 49. An exit conduit 47 is in fluid flow relationship with the exit of the expansion chamber 21 at the diffuser housing 15 and leads to a reclamation cooler 57 which is in fluid flow relationship with a compressor 61. Bypass conduit 49 is also in fluid flow relationship with the expansion chamber 21, and leads to a low speed heat exchanger, or cooler 53 which is connected by a junction conduit 55 to the compressor 61. A control valve 69 within the by-pass conduit 49 controls the amount of working fluid within the expansion chamber 21 which enters the by-pass conduit 49. The compressor 61 is in fluid flow relationship with a heat exchanger 50 which cools the working fluid. The heat exchanger 50 is in fluid flow relationship with the tank 41 by means of additional conduit 51. The heat exchanger 50 lowers the temperature of the working fluid received from the compressor 61 prior to its return through the conduit 51 to tank 41 to prevent excessive expansion of working fluid in the tank 41. The heat exchanger 50 lowers the temperature of working fluid within the closed loop system thereby converting any remaining gas into liquid after cooling by the reclamation cooler 57. The liquid may be pumped into tank 41, by an additional gear pump 62 (if necessary), which should contain liquid working fluid therein.

As shown in FIG. 3, a cooling conduit 401 may be connected between the additional conduit 51 and turbines 13, 31 to allow cool working fluid to cool the turbine blades, if necessary. A control valve 331 may be located within the conduit to control the amount of cool working fluid necessary to cool the turbines. Although only one cooling conduit 401 is shown, it is apparent to one skilled in the art that additional cooling conduits may be used, and/or multiple cooling parts used to cool different turbines may also be used.

Operation of the closed loop thermodynamic system 11 in conjunction with engine combustion will now be described. Combusted gases within the combustion chamber 19 will heat the expansion chamber 21 which is in heat transfer relationship with the combustion chamber 19. Working fluid within the expansion chamber 21 will then be vaporized. The increase in pressure due to the working fluid expansion will force the vaporized fluid through the turbine nozzles 93, 92, 91 thereby rotating turbine wheels 28, 29, and 31. The gas will be directed through the impulse reaction turbine wheels and the expansion turbine 13 prior to being directed through the outlet conduit 47 by the diffuser housing 15. The rotation of the impulse reaction turbine 31 and expansion turbine 13 rotates the shaft 23 and compressor blades 27. As a result, air from the inlet 12 will be compressed within the compressor 9 and forced into the combustion chamber 19 where it is mixed with fuel by the fuel nozzle 37 and combusted by the ignitor 39.

The working fluid, which has rotated the turbines 13, 28, 29 and 31, passes through the reclamation cooler 57 where it is cooled to a lower temperature. The working fluid may then be compressed by the compressor 61, if necessary, and cooled by the heat exchanger 50 to the liquid state prior to being pumped by gear pump 62 into the holding tank 41 and recirculated into the expansion chamber 21.

Therefore, unlike conventional axial flow turbine engines where exhaust gases drive the turbines, the exhaust gases are used to heat an inert gas within an expansion chamber which then rotates the turbine blades. The exhaust gases do not contact the expansion turbine blades.

To provide for maximum heat transfer between the combustion chamber 19 and expansion chamber 21, the expansion chamber 21 may be concentrically located within the combustion chamber 19 to optimize heat transfer therebetween. The expansion chamber 21 may be supported to the outer housing of the engine by support struts 75 which extend radially from the expansion chamber to the housing wall of the engine. The support struts may be insulated to prevent heat transfer from or to the conduits 49 and 43. It will be apparent to one skilled in the art that other configurations and/or techniques may be implemented while still utilizing the principles of the present invention.

To regulate the temperature within the expansion chamber, a cooling chamber 63 may be located concentrically between the expansion chamber 21 and combustion chamber 19 within a thermocontrol housing 64. The thermocontrol housing 64 may contain a cooling chamber inlet 65 to allow air to flow from the lead diffuser housing 33 into the cooling chamber 63. The cooling chamber inlet 65 may contain a valve means 89 to regulate air flow within the cooling chamber 63. If, the valve means 89 is open, then air from within the lead diffuser housing 33 will flow into the cooling chamber 63. Heat will be drawn away from the expansion chamber 21 since the cooling chamber 63 is in heat transfer relationship with the expansion chamber and combustion chamber. Air within the cooling chamber 63 will then exit the engine at the exhaust section by means of a cooling air flow exit 68. As will be discussed infra, the cooling chamber inlet valve may be controlled by a microprocessor means to regulate the cooling air flow therethrough.

In order to facilitate heat transfer between the combustion chamber 19 and expansion chamber 21, fins 67, which may be ring shaped, may be located between the combustion chamber 19 and expansion chamber 21 and therefore extend through the cooling chamber 63. Other fin shapes may be used. However, the fins must allow air to flow through the cooling chamber. The fins 67 will enable heat to be conducted therethrough from the combustion chamber 19 to the expansion chamber 21. Moreover, air flow from within the cooling chamber 63 can also be used to regulate the temperature of the fins 67 so as to control the amount of heat transfer therethrough.

In order to regulate the temperature and pressure within the closed loop system 11 and to control the compressor speed, a by-pass conduit network may be used to allow working fluid to by-pass the impulse reaction turbine 31 and expansion turbine 13. The by-pass conduit network includes the by-pass conduit 49 which is in fluid flow relationship with the closed loop system 11. The by-pass conduit 49 is connected to the expansion chamber 21 and leads to a low speed cooler or heat exchanger 53 which may be in fluid flow relationship with the compressor 61 by means of a junction conduit 55. The by-pass conduit 49 may contain a control valve 69 therein. As will be discussed infra, this control valve 69 may be controlled by a microprocessor means so as to regulate the flow of fluid which enters the by-pass conduit into the by-pass system. A discharge means 73 may be connected to the closed loop system such that the working fluid may be discharged from the closed loop system 11. The discharge means 73 may operate as an internal fire extinguishing system capable of extinguishing a fire within the engine or engine housing. A fire sensing means may be located within the engine housing to determine the existence of fire. Upon the sensing of a fire, the discharge 73 may be open by means of a discharge valve not shown.

Figure 2:
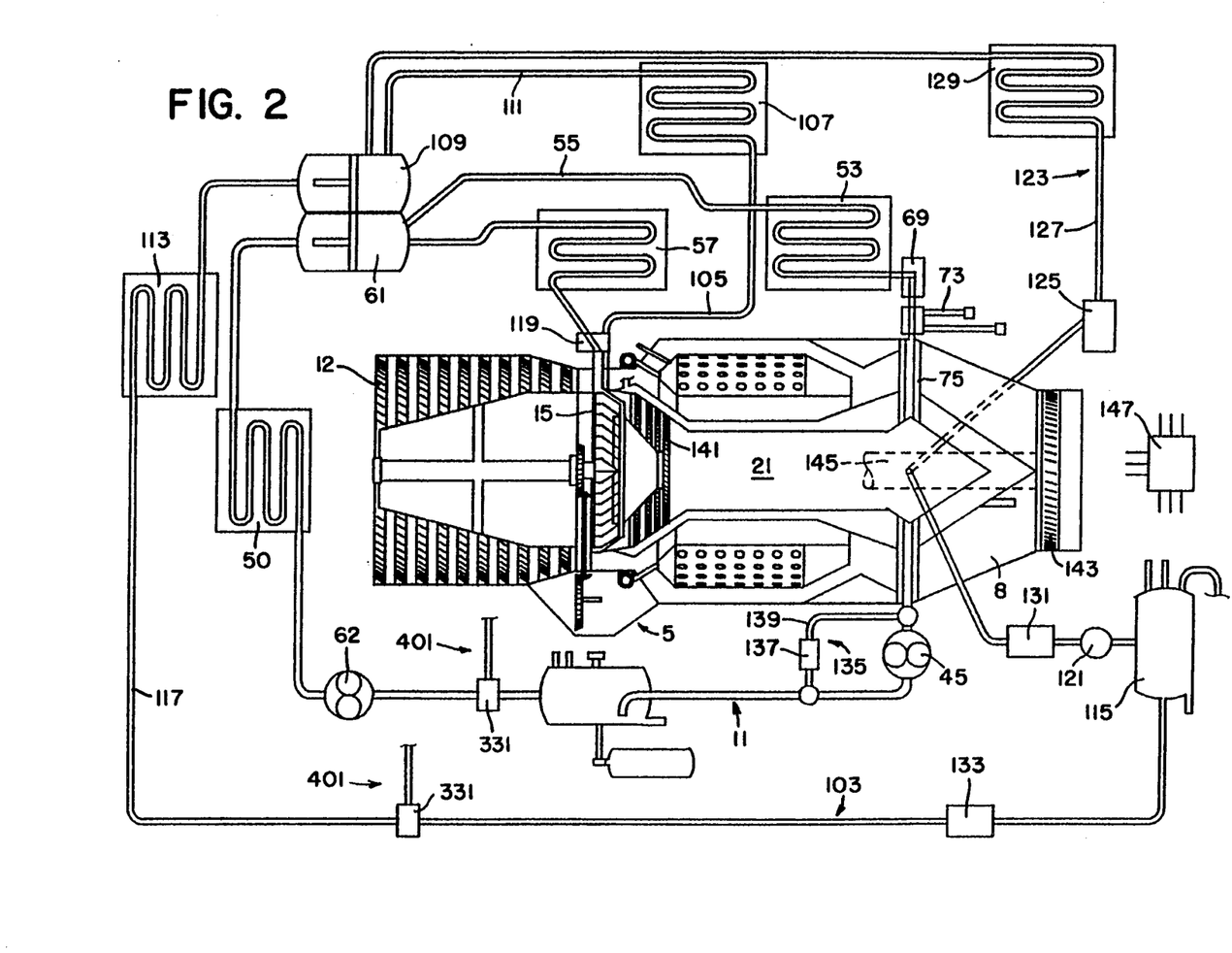
FIG. 2 represents a schematic representation of yet another embodiment of an axial flow inert gas turbine engine in accordance with the principles of the present invention.

Referring now to FIG. 2 where a modified embodiment of the turbine engine 1 is shown, a second closed loop system 103 has been added. This second closed loop thermodynamic system may be similar to the first closed loop system 11 depicted in FIGS. 1 or 3. A modified version of the first closed loop system 11 is also depicted in FIG. 2. This closed loop system does not contain a cooling conduit 401 (FIG. 1), although one may be added. In this embodiment, the second closed loop system 103 may be used as a backup to the first closed loop system 11 in case of a failure of the first closed loop system because of, for example, a leak, etc. The second closed loop system 103 contains a exit conduit 105 leading from the diffuser housing to a heat exchanger 107. The heat exchanger 107 is in fluid flow relationship with a compressor 109 by means of a conduit 111. The compressor 109 is connected to another heat exchanger 113 which leads to a storage tank 115 by means of a conduit 117. A valve means 119 may control the flow of working fluid through the second exit conduit 105 from the diffuser housing 15 into the second closed loop system 103. A pump 121 may be used to pump fluid through the second closed loop system 103. As is readily apparent to one skilled in the art, additional pumps may be used or incorporated into the second closed loop system 103.

The second closed loop system may also contain a second by-pass network 123 which is controlled using by-pass valve 125. An exit conduit 127 leads from the expansion chamber 21 and by-pass valve 125 into a second by-pass heat exchanger 129 and into the compressor 109. Working fluid within the by-pass system is compressed in the compressor 109 and subsequently cooled in another heat exchanger 113 prior to flowing within a storage tank 115 and into the expansion chamber. A second and third valve means 131 and 133 may be present within second closed loop system 103 may be to allow the mixed second closed looped system 103 to be used in lieu of the first closed loop system in case of an emergency.

As shown in FIG. 2, the first closed loop system may also include a pump by-pass system 135, which includes a valve 137 and conduit 139 which by-passes the gear pump 45. Operation of the by-pass valve 137 will control the amount of fluid by-passing gear pump 45.

Figure 4:
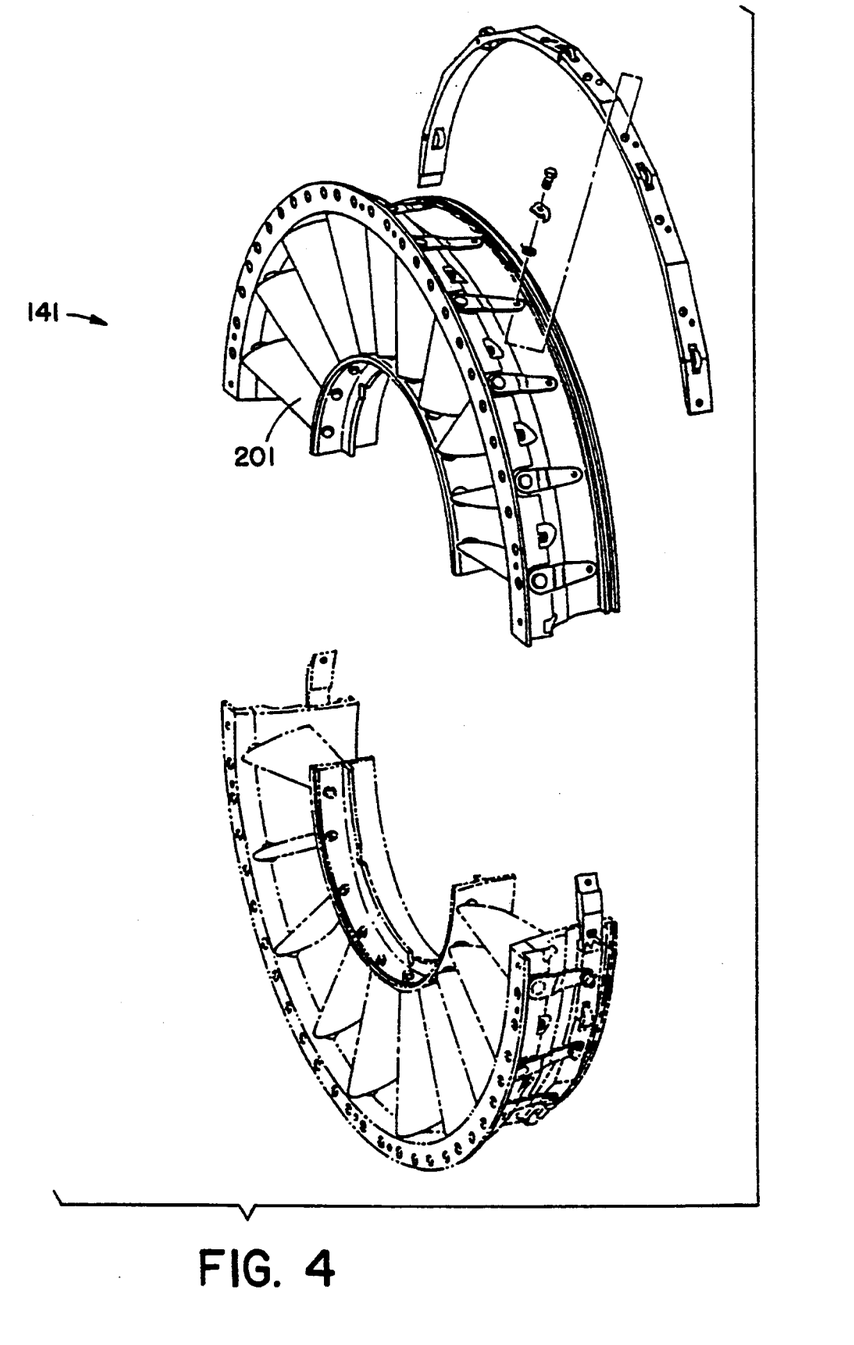
FIG. 4 depicts an isometric representation of a variable turbine nozzle assembly useable within the inert gas turbine engine in accordance with the principles of the present invention.

Referring now to the turbine section 5 of the axial flow turbine engine 1 of FIG. 2, a variable turbine nozzle assembly 141 may be located in the expansion chamber directly in front of the impulse reaction turbine 31. As shown in FIG. 4, the variable turbine nozzle assembly contains a plurality of pivotal veins 201 which act as nozzles. The fluid flow through the nozzle assembly 141 may be directed by the angle of the veins 201. At low turbine speeds, i.e., start-up or shutdown, the veins are turned towards the radial direction to enable working fluid flowing from the expansion chamber 21 through the variable turbine nozzle assembly 141 to be directed perpendicularly relative to the surface of the turbine blades so as to provide maximum force to rotate the impulse reaction turbine 31.

Conversely, at high turbine speeds, the veins 201 may be angled towards the axial direction such that the fluid flowing from the expansion chamber 21 is not directed perpendicularly to the turbine blades. In this position the veins 201 will not restrict the flow of fluid from the expansion chamber 21 to allow for high speed operation of the turbines 13, 31 and the compressor 9. The use of a variable inlet guide vanes, for example, at the inlet 12, (not shown) in conventional axial flow turbine engines is well known in the art. The application of the variable turbine nozzle assembly 141 into the improved axial flow turbine engine, as depicted in FIGS. 1, 2, and 3, will operate using the same principles as a variable inlet guide vane, which is well known in the art and will also provide similar advantages.

Also as depicted in FIG. 2, a free wheeling turbine 143 may be optionally located at the exhaust section of the engine and be connected to a rotatable shaft 145 which may extend through the expansion chamber 21. The shaft 145 may be used to power accessories to the engine (not shown) or secondary compressors (also not shown) or helicopter transmissions, or electric generators, etc. as is well known in the art. A microprocessor 147 may be used to control each of the valves and pumps located within the system such that the proper amounts of working fluid are allowed to flow through the closed loop systems. The microprocessor may receive signals from various temperature, flowrate and/or pressure sensing devices and may activate valves to control the flow of the working fluid and/or air within the cooling chamber. Also, the microprocessor may control the angle of the nozzles in the variable turbine nozzle assembly 141. The flow of working fluid, as well as the flow of air through the system, may be controlled by the microprocessor 147 to optimize engine performance under a variety of different conditions.

The components of the improved axial flow inert gas turbine engine may be constructed of materials typically used in the construction of conventional turbine engines, which are well known in the art.

Figure 5:
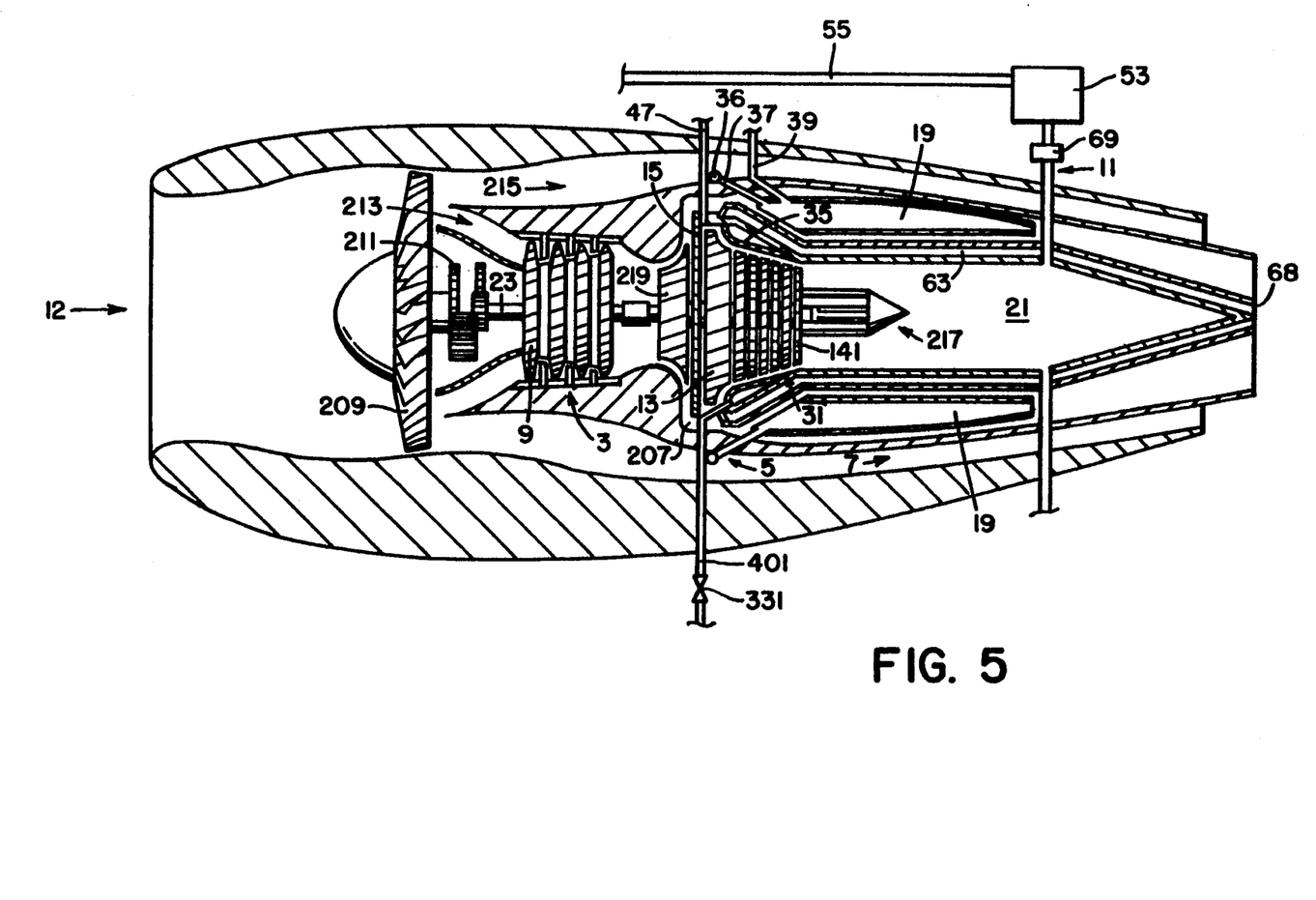
FIG. 5 depicts a schematic representation of a forward fan axial flow inert gas turbine engine constructed in accordance with the principles of the present invention including a variable area reducer located within the expansion chamber.

FIG. 5 depicts a forward fan inert gas turbine engine constructed in accordance with the principles of the present invention. In this engine, inlet air enters the inlet section 12 where it passes through a forward fan 209. The air passing through the forward fan into the compressor section 3 may travel either towards a fan discharge pass 215 or compressor air path 213. Air passing through the compressor path 213 is compressed by the forward compressor 9 where it passes through the compressor blades and vanes. Air then passes into a rear compressor 219 where it is further compressed and then directed radially by a lead diffuser housing 207. The air then flows axially into the combustion chamber 19 where it is mixed with fuel from the fuel manifold 36 and ignited by ignitor 39. The turbine section 5 and combustion section 7 of the engine operate similar to the embodiments of the engines depicted in FIGS. 1, 2 and 3. Working fluid is within the closed loop system 11, which is similar to the closed loop system previously discussed in reference to the embodiments depicted in FIGS. 1-4. For example, the working fluid within the expansion chamber 21 is heated and expands through the variable turbine nozzle assembly 141 and through an impulse reaction turbine 31 and expansion turbine 13 where it exits the turbine section by means of a diffuser housing 15. The portion of compressed air which enters the combustion chamber 19 to be mixed with fuel and combusted may be diverted through the cooling chamber 63 as previously discussed in reference to the embodiments depicted in FIGS. 1-4.

The embodiment of the invention depicted in FIG. 5, however, contains a variable area reducer 217 within the expansion chamber 21. The variable area reducer is capable of varying the volume within the expansion chamber 21 to thereby vary the pressure of the working fluid therein. By reducing the volume within the expansion chamber 21, the pressure of the working fluid therein may be increased and the force of the working fluid on the impulse reaction turbine 31 blades and expansion turbine 13 blades may be increased. Accordingly, the variable area reducer 217 may be utilized to provide additional torque to the turbines 13, 28, 29, 31 and shaft 23 which may be desireable to start the engine.

Figure 6:
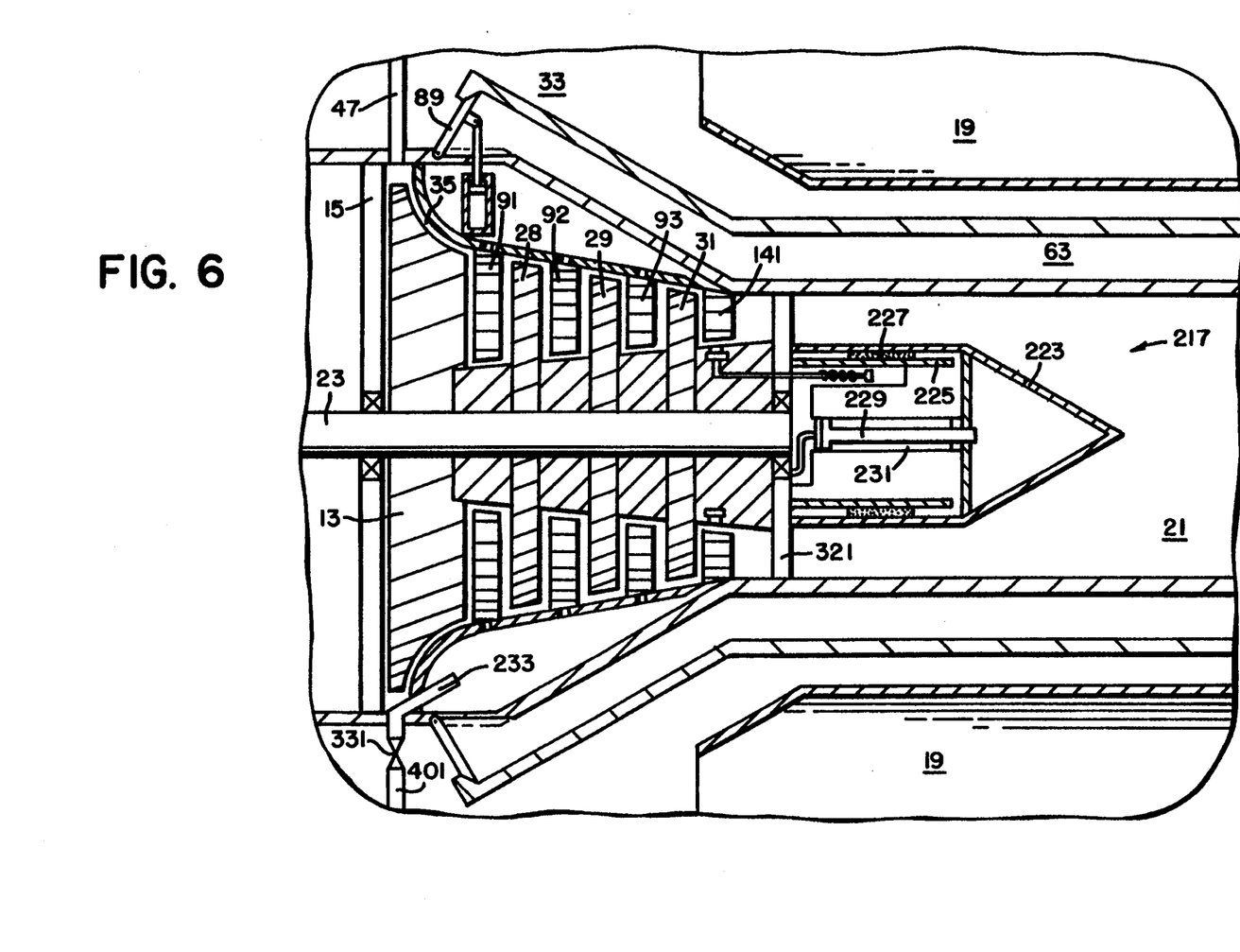
FIG. 6 depicts a sectional view of a variable area reducer within the expansion chamber of an inert gas turbine engine constructed in accordance with the principles of the present invention.

FIG. 6 depicts a sectional view of an inert gas turbine engine, such as that depicted in FIG. 5, constructed in accordance with the principles of the present invention containing a variable area reducer 217. The variable area reducer is mounted within the expansion chamber 21 by means of support struts 321, or other suitable means. The variable area reducer contains an outer shell, which may be conically shaped, 223 within a cylindrical base 225. The shell 223 is slidable axially relative to the cylindrical base 225. A sealing means 227 may be located between the conical cover 23 and cylindrical base 225. Various sealing means may suffice, including, for example, chevron type seals, for this particular purpose. Accordingly, the interior portion of the variable area reducer 217 is sealed from the expansion chamber 21 such that heated working fluid within the expansion chamber 21 does not enter the interior of the variable area reducer. A piston 229 affixed to the conical cover 223 may be used to translate the variable area reducer conical cover 223. The piston 229 may be located within a cylinder 231 where a supply of a pressurized fluid may be pumped to cause the piston to translate and the variable area reducer to expand. For convenience, cool working fluid from within the closed loop system 11 may be pumped, or controlled by a valve means, within the cylinder 231 to control the position of piston 229 and the variable area reducer.

As shown in FIG. 6, and as previously referred to if additional cooling of the turbine blades is necessary, a cooling conduit leading to a cooling port 233 may supply cool working fluid from the closed looped system 11 to the turbine blades. A control valve 331 may be used to control the flow of cool working fluid to the turbine blades to allow for proper cooling of the turbine blades, if necessary. The valve 331 may be controlled by the microprocessor 147, as previously discussed in reference to the embodiment depicted in FIG. 2. Although not shown, multiple cooling ports may be used to cool each of the turbine blades and/or turbine disks.

When starting the engine, the variable turbine nozzle assembly vanes 201 (FIG. 4) may be oriented in the position which will allow maximum flow of working fluid towards the turbine blade in order to provide maximum torque on the turbine blades. Also, the variable area reducer should be placed in its extended position so as to minimize the volume within the expansion chamber 21. Under these conditions, the pressure of the working fluid due to its expansion via the heat from the combustion chamber provide maximum torque on the impulse reaction turbine blades to start rotation of the drive shaft 23. The variable turbine nozzle assembly may be controlled either pneumatically, hydraulically, or electrically as well as by other mechanical or electrical means as is well known in the art, and the invention is not limited to any particular technique.

While the invention has been described in conjunction with the embodiments depicted in FIGS. 1-6, it will be apparent to one skilled in the art that various modifications, substitutions, alterations, and equivalents may be implemented without departing in any way from the spirit and scope of the invention. For example, various types of combustion chambers, turbine and/or compressor systems in a variety of conventionally known turbine engines may be used in conjunction with the inert gas turbine engine in accordance with the principles of the present invention. Additionally, various flow control techniques for the flow of working fluid and/or air within the engine as well as various thermodynamic variations to the working fluid within the closed loop system may be made without departing from the scope of the invention. Also, the techniques used to control the thermodynamic properties of the working fluid within the closed looped system may be varied according to well known principles in the art. Furthermore, the features depicted in each of the figures herein are not limited to the specific embodiment depicted in the figure. These features may be implemented in more than one embodiment. All such variations and modifications, etc. are intended to be covered by the following claims.

What is claimed:

1. A thrust producing inert gas turbine engine comprising:
    an inlet section having a compressor therein;
    a combustion section in air flow relationship with the inlet section and compressor, said combustion section comprising a combustion chamber in air flow relationship with the compressor;
    an expansion chamber in heat transfer relationship with the combustion chamber;
    an exhaust section in air flow relationship with the combustion section;
    an expansion turbine in fluid flow relationship with the expansion chamber wherein heated working fluid from the expansion chamber rotates the expansion turbine;
    a first working fluid closed loop system comprising a condenser portion in fluid flow relationship with the expansion chamber and expansion turbine, wherein a working fluid within the expansion chamber is heated within the expansion chamber, rotates the expansion turbine and is cooled in the condenser portion prior to being reheated in the expansion chamber;
    means for driving the compressor as the expansion turbine rotates, wherein air from the compressor is forced into the combustion chamber for mixture with a fuel and combustion, and wherein combustion of fuel and air within the combustion chamber heats working fluid in the expansion chamber causing the working fluid to rotate the expansion turbine and drive the compressor thereby forcing air into the combustion chamber to be mixed with fuel, combusted and exhausted through the exhaust section to produce thrust.

2. The inert gas turbine engine of claim 1 wherein the combustion chamber is annular in shape and surrounds at least a portion of the expansion chamber.

3. The inert gas turbine engine of claim 2 wherein the means for driving the compressor comprises a shaft connected to the compressor and expansion turbine.

4. The inert gas turbine engine of claim 3 wherein the closed loop system comprises a heat exchanger for cooling the working fluid.

5. The inert gas turbine engine of claim 3 wherein the closed loop system further comprises a compressor for compressing working fluid which has been heated into a gas phase within the expansion chamber.

6. The inert gas turbine engine of claim 5 wherein the closed loop system comprises a first storage tank.

7. The inert gas turbine engine of claim 6 further comprising an impulse reaction turbine in fluid flow relationship with the expansion chamber wherein the working fluid heated within the expansion chamber turns the impulse reaction turbine.

8. The inert gas turbine engine of claim 7 further comprising a variable turbine nozzle assembly located between the expansion chamber and the impulse reaction turbine and the expansion turbine for varying the flow of working fluid into said impulse reaction turbine and expansion turbine.

9. The inert gas turbine engine of claim 8 further comprising an expansion chamber thermocontrol housing having a cooling chamber therein, said cooling chamber being in heat transfer relationship with the expansion chamber for cooling and in fluid flow relationship with the compressor for allowing compressed air therein to cool the expansion chamber.

10. The inert gas turbine engine of claim 9 further comprising one or more fins located within the expansion chamber, and said fins extending into the combustion chamber.

11. The inert gas turbine engine of claim 10 wherein the fins also pass through the expansion chamber thermocontrol housing and cooling chamber.

12. The inert gas turbine engine of claim 11 further comprising a second closed loop working fluid system in parallel with the first closed loop working fluid system said second system being in fluid flow relationship with the expansion chamber and expansion turbine for cooling the working fluid from the expansion chamber and expansion turbine prior to reheating in the expansion chamber.

13. The inert gas turbine engine of claim 11 wherein the first or second closed loop system is connected to a fire extinguishing system wherein the working fluid is released from the closed loop system and used to extinguish fire within the engine or engine housing.

14. The inert gas turbine engine of claim 11 further comprising means for controlling the flow of working fluid through the first closed loop system.

15. The inert gas turbine engine of claim 14 wherein the means for controlling the flow of working fluid through the first closed loop system comprises one or more valves.

16. The inert gas turbine engine of claim 15 wherein the valves are controlled by a microprocessor to provide the correct amount of working fluid flow through the first closed loop system.

17. The inert gas turbine engine of claim 3 further comprising means for allowing working fluid within the closed loop system to cool the expansion turbine.

18. The inert gas turbine engine of claim 17 wherein the means for allowing working fluid within the closed loop system to cool the expansion turbine comprises a conduit leading from the closed loop system, said conduit being in fluid flow relationship with the expansion turbine to cool the expansion turbine.

19. The inert gas turbine engine of claim 3 further comprising a variable area reducer located within the expansion chamber for varying the volume within the expansion chamber.

20. A thrust producing inert gas turbine engine comprising:
   an inlet section having a compressor therein;
   a combustion section being in air flow relationship with the compressor, said combustion section including an expansion chamber in heat transfer relationship with a combustion chamber;
   an expansion turbine in fluid flow relationship with the expansion chamber wherein heated working fluid from the expansion chamber rotates the expansion turbine;
   an exhaust section in air flow relationship with the combustion section wherein combusted air and fuel within the combustion chamber is exhausted through said exhaust section without contacting the expansion turbine to produce thrust.

* * * * *